US006965968B1

(12) United States Patent
Touboul

(10) Patent No.: US 6,965,968 B1
(45) Date of Patent: Nov. 15, 2005

(54) POLICY-BASED CACHING

(75) Inventor: Shlomo Touboul, Kefar-Haim (IL)

(73) Assignee: Finjan Software Ltd., Netanya (IL)

(*) Notice: Subject to any disclaimer, the term of this patent is extended or adjusted under 35 U.S.C. 154(b) by 190 days.

(21) Appl. No.: 10/376,215

(22) Filed: Feb. 27, 2003

(51) Int. Cl.[7] .............................................. G06F 12/00
(52) U.S. Cl. ........................ 711/118; 711/114; 709/229
(58) Field of Search ................................ 711/114, 118; 709/229

(56) References Cited

U.S. PATENT DOCUMENTS

| | | | |
|---|---|---|---|
| 5,077,677 A | 12/1991 | Murphy et al. | |
| 5,359,659 A | 10/1994 | Rosenthal | |
| 5,361,359 A | 11/1994 | Tajalll et al. | |
| 5,485,409 A | 1/1996 | Gupta et al. | |
| 5,485,575 A | 1/1996 | Chess et al. | |
| 5,572,643 A | 11/1996 | Judson | |
| 5,606,668 A | 2/1997 | Shwed | |
| 5,623,600 A | 4/1997 | Ji et al. | |
| 5,638,446 A | 6/1997 | Rubin | |
| 5,692,047 A | 11/1997 | McManis | |
| 5,692,124 A | 11/1997 | Holden et al. | |
| 5,720,033 A | 2/1998 | Deo | |
| 5,724,425 A | 3/1998 | Chang et al. | |
| 5,740,248 A | 4/1998 | Fieres et al. | |
| 5,761,421 A | 6/1998 | van Hoff et al. | |
| 5,765,205 A | 6/1998 | Breslau et al. | |
| 5,784,459 A | 7/1998 | Devarakonda et al. | |
| 5,796,952 A | 8/1998 | Davis et al. | |
| 5,805,829 A | 9/1998 | Cohen et al. | |
| 5,832,208 A | 11/1998 | Chen et al. | |
| 5,850,559 A | 12/1998 | Angelo et al. | |
| 5,859,966 A | 1/1999 | Hayman et al. | |
| 5,864,683 A | 1/1999 | Boebert et al. | |
| 5,892,904 A | 4/1999 | Atkinson et al. | |
| 5,951,698 A | 9/1999 | Chen et al. | |
| 5,956,481 A | 9/1999 | Walsh et al. | |
| 5,974,549 A | 10/1999 | Golan | |
| 5,978,484 A | 11/1999 | Apperson et al. | |
| 5,983,348 A * | 11/1999 | Ji ............................... 713/200 | |
| 6,092,194 A | 7/2000 | Touboul | |
| 6,154,844 A | 11/2000 | Touboul et al. | |
| 6,167,520 A | 12/2000 | Touboul | |
| 6,425,058 B1 | 7/2002 | Arimilli et al. | |
| 6,434,668 B1 | 8/2002 | Arimilli et al. | |
| 6,434,669 B1 | 8/2002 | Arimilli et al. | |
| 6,480,962 B1 | 11/2002 | Touboul | |
| 6,519,679 B2 | 2/2003 | Devireddy et al. | |
| 6,772,214 B1 * | 8/2004 | McClain et al. ............ 709/229 | |

OTHER PUBLICATIONS

Jim K. Omura, "Novel Applications of Cryptography in Digital Communications", IEEE Communications Magazine, May, 1990; pp. 21-29.

Okamoto, E. et al., "ID-Based Authentication System For Computer Virus Detection", IEEE/IEE Electronic Library online, Electronics Letters, vol. 26, Issue 15, ISSN 15, ISSN 0013-5194, Jul. 19, 1990, Abstract and pp. 1169-1170. URL:http://iel.ihs.com:80/cgi-bin/iel_cgi?se...
2ehts%26ViewTemplate%3ddocview%5fb%2ehts.

(Continued)

*Primary Examiner*—Mano Padmanabhan
*Assistant Examiner*—Duc T Doan
(74) *Attorney, Agent, or Firm*—Eitan Law Group

(57) ABSTRACT

A policy-based cache manager, including a memory storing a cache of digital content, a plurality of policies, and a policy index to the cache contents, the policy index indicating allowable cache content for each of a plurality of policies, a content scanner for scanning a digital content received, to derive a corresponding content profile, and a content evaluator for determining whether a given digital content is allowable relative to a given policy, based on the content profile. A method is also described and claimed.

38 Claims, 2 Drawing Sheets

OTHER PUBLICATIONS

IBM AntiVirus User's Guide Version 2.4, International Business Machines Corporation, Nov. 15, 1995, p. 6-7.

Norvin Leach et al, "IE 3.0 Applets Will Earn Certification", PC Week, vol. 13, No. 29, Jul. 22, 1996, 2 pages.

"Finjan Software Releases SurfinBoard, Industry's First JAVA Security Product For the World Wide Web", Article published on the Internet by Finjan Software Ltd., Jul. 29, 1996, 1 page.

"Powerful PC Security for the New World of Java™ and Downloadables, Surfin Shield™" Article published on the Internet by Finjan Software Ltd., 1996, 2 pages.

Microsoft® Authenticode Technology, "Ensuring Accountability and Authenticity for Software Components on the Internet", Microsoft Corporation, Oct. 1996, including Abstract, Contents, Introduction and pp. 1-10.

"Finjan Announces a Personal Java™ Firewall For Web Browsers—the SurfinShield™ 1.6 (formerly known as SurfinBoard)", Press Release of Finjan Releases SurfinShield 1.6, Oct. 21, 1996, 2 pages.

Company Profile "Finjan—Safe Surfing, The Java Security Solutions Provider" Article published on the Internet by Finjan Software Ltd., Oct. 31, 1996, 3 pages.

"Finjan Announces Major Power Boost and New Features for SurfinShield™ 2.0" Las Vegas Convention Center/ Pavilion 5 P5551, Nov. 18, 1996, 3 pages.

"Java Security: Issues & Solutions" Article published on the Internet by Finjan Software Ltd., 1996, 8 pages.

"Products" Article published on the Internet, 7 pages.

Mark LaDue, "Online Business Consultant: Java Security: Whose Business is It?" Article published on the Internet, Home Page Press, Inc. 1996, 4 pages.

Ron Moritz, "Why We Shouldn't Fear Java." Java Report, Feb., 1997, pp. 51-56.

Web Page Article "Frequently Asked Questions About Authenticode", Microsoft Corporation, last updated Feb. 17, 1997, Printed Dec. 23, 1998. URL: http://www.microsoft.com/workshop/security/authcode/signfaq.asp#9, pp. 1-13.

Zhang, X.N., "Secure Code Distribution", IEEE/IEE Electronic Library online, Computer, vol. 30, Issue 6, Jun., 1997, pp.: 76-79.

Khare, Rohit, "Microsoft Authenticode Analyzed", Jul. 22, 1996, 2 pages. URL: http://www.xent.com/FoRK-archive/summer96/0338.html.

"Release Notes for the Microsoft ActiveX Development Kit", Aug. 13, 1996, 11 pages. URL: http://activex.adsp.or.jp/inetsdk/readme.txt.

"Microsoft ActiveXSoftware Development Kit", Aug. 12, 1996, 6 pages. URL: http://activex.adsp.or.jp/inetsdk/help/overview.htm.

* cited by examiner

POLICY-BASED CACHING

FIELD OF THE INVENTION

The present invention relates to cache management and content filtering.

BACKGROUND OF THE INVENTION

Conventional caching is used to avoid repeating the same computations or the same data transmission. Familiar Internet browsers cache web pages so that these pages do not have to be re-transmitted when a user returns to view the same page a second time. The advantage of caching is readily noticed, as the first time a user navigates to a web page, it typically takes a few seconds for his browser to render the page, yet when a user returns to the same web page, for example, by clicking on a "Back" button, the page is re-rendered immediately. This happens because the user's Internet browser typically caches the web page after it is received from a web server, so that the second time around the page is already available on the user's computer for rendering.

Caching is also used by proxy servers, which are intermediaries between servers on the Internet and a local network of client computers. Proxy servers are often requested to deliver the same web pages to multiple client computers, and thus proxy caching makes it possible to deliver web pages quickly, the second time they are requested.

Caching is also used by computational processors, to save intermediate results that would otherwise need to be computed repeatedly. For example, if a computational expression repeatedly includes a term sin(x), then such term can be cached so that it does not need to be calculated more than once. Many compilers are able to parse source code and determine efficient intermediate results to cache.

Caching is also used in conjunction with content control, used to control what content is delivered to client computers. Content control typically operates by filtering incoming content according to a "policy" that includes one or more rules. For example, URL filtering is used to block "undesirable" web pages from being delivered. Often the determination of what is undesirable is set by a user or by a computer system administrator. In this regard, a policy is the set of rules that determine what URLs to allow or not allow to pass through the filter, and typically only allowable URLs are cached.

A shortcoming of conventional caching as used in conjunction with content control is the inability to support more than one policy. That is, once content gets through a first policy, it is cached, and then it is readily available to users governed by a second policy, even if the second policy would not have allowed the content to pass through the filter.

Using conventional caching, workarounds include disabling the cache, which defeats the advantages of caching, or using multiple caches, one cache per distinct policy, which suffers from redundancy since the same content will typically be stored in multiple caches.

SUMMARY OF THE INVENTION

The present invention provides a method and system for enabling a single cache to serve as multiple caches. With respect to content control, the present invention enables management of a single cache so as to control content relative to a plurality of policies. Using the present invention, a single cache appears transparently as multiple caches; e.g., a policy A cache, a policy B cache and a policy C cache.

The present invention enhances conventional caching by including a policy-based index, which is a data structure indicating allowability of cached content relative to a plurality of policies. Using the policy-based index of the present invention, a cache manager can check whether cached content is allowable for a different user than the original user who requested it, and thus block cached content from being delivered to users for whom it is not allowed.

The present invention has many diverse applications. In conjunction with content control systems, for example, the present invention is advantageous inter alia for URL filtering, e-mail anti-spam filtering, anti-virus protection and malicious mobile code protection systems. In conjunction with document management systems, the present invention is advantageous inter alia for document protection, version control and data encryption. In conjunction with file management systems, the present invention is advantageous inter alia for file protection and file sharing. In conjunction with multimedia systems, the present invention is advantageous inter alia for cable and satellite broadcasting, video on demand, streaming audio and video, and access to still imagery.

It may thus be appreciated that the present invention provides breakthrough technology for cache management.

There is thus provided in accordance with a preferred embodiment of the present invention a policy-based cache manager, including a memory storing a cache of digital content, a plurality of policies, and a policy index to the cache contents, the policy index indicating allowable cache content for each of a plurality of policies, a content scanner for scanning a digital content received, to derive a corresponding content profile, and a content evaluator for determining whether a given digital content is allowable relative to a given policy, based on the content profile.

There is further provided in accordance with a preferred embodiment of the present invention a method for policy-based caching, including receiving a user request for a digital content, the user having associated therewith a policy from among a plurality of policies, determining based on a cache, whether the requested digital content is already available, determining based on a policy index of the cache contents, whether the requested digital content is allowable for the user, if the determining based on a cache indicates that the data content is already available in the cache, and determining based on a profile of the requested data content, whether the requested data content is allowable for the user's policy, if the determining based on the policy index is non-conclusive.

There is yet further provided in accordance with a preferred embodiment of the present invention a computer-readable storage medium storing program code for causing a computer to perform the steps of receiving a user request for a digital content, the user having associated therewith a policy from among a plurality of policies, determining based on a cache, whether the requested digital content is already available, determining based on a policy index of the cache contents, whether the requested digital content is allowable for the user, if the determining based on a cache indicates that the data content is already available in the cache, and determining based on a profile of the requested data content, whether the requested data content is allowable for the user's policy, if the determining based on the policy index is non-conclusive.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention provides a novel cache management method and system, for enabling policy-based caching. Specifically, the cache manager of the present invention manages a single cache as if it were multiple caches, each cache corresponding to a different policy.

Figure 1:
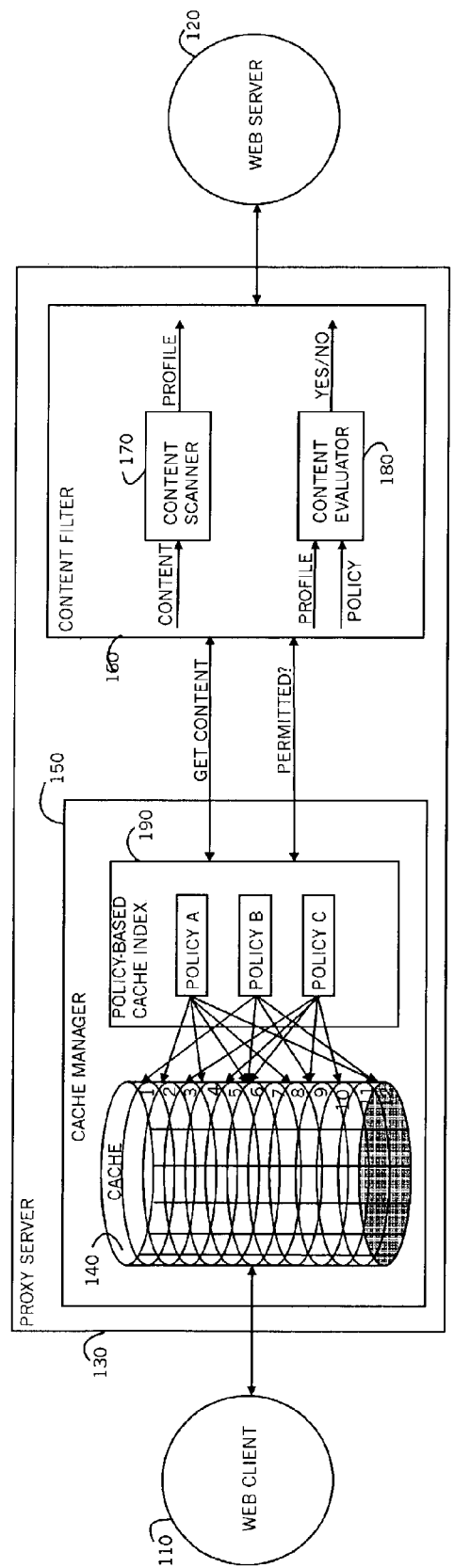
FIG. 1 is a simplified block diagram for a cache manager that provides policy-based caching, in accordance with a preferred embodiment of the present invention.

Reference is now made to FIG. 1, which is a simplified block diagram for a cache manager that provides policy-based caching, in accordance with a preferred embodiment of the present invention. Shown in FIG. 1 is a web client 110, which typically requests web pages from the Internet, the web pages having links to static content, such as GIF and JPEG images, and to active content, such as Java applets and ActiveX controls. The web pages and the static and active content referenced therein are located on one or more web servers 120.

For many networks, a proxy server 130 acts as an intermediary between web server 120 and web client 110. Use of a proxy server provides for efficiency in delivery, and for control over allowable content. An important component of proxy server 130 is a cache 140 of stored content, and a cache manager 150 for managing access to cache 140. Cache manager 150 stores content received from web servers 120 within cache 140, so that such content is readily available for transmission when it is subsequently requested by web client 110 or by another web client.

Thus when proxy server 130 receives a request from web client 110 for content, it preferably first checks whether the requested content is already stored in cache 140, and, if so, transmits the content directly from cache 140, obviating the need to first request and receive the content from web server 120.

In accordance with a preferred embodiment of the present invention, proxy server 130 generally includes a content filter 160, used to block content from being transmitted to web client 110. Content filter 160 may be, for example, a URL filter used to block URL's that have undesirable content, or spam. Content filter 160 may also be, for example, an anti-virus filter that blocks content known to contain a computer virus therewithin. Content filter 160 may also be a pro-active security filter, such as described in applicant's U.S. Pat. Nos. 6,092,194, 6,154,844, 6,167,520 and 6,480,962, the contents of which are hereby incorporated by reference. Such a security filter scans incoming mobile code to determine a security profile therefor, the security profile indicating suspicious operations performed by the mobile code.

Generally speaking, content filter 160 is a module that includes a content scanner 170 for scanning incoming content, and a content evaluator 180 for determining whether or not the content is allowable, based on a policy. The policy may, for example, indicate which URL's are to be blocked, or which computer viruses are known and should thus be blocked, or which suspicious operations are permitted. Typically, content scanner 170 scans received content and determines a profile therefor, so that content evaluator 180 can determine allowability of content by comparing the content profile to a policy. In general, content scanner 170 produces a content profile as output, from a digital content as input; and content evaluator 180 produces a Boolean yes/no result as output, from a profile and a policy as input.

It may be appreciated by those skilled in the art that content evaluator may operate directly on a digital content as input, and not require use of a profile. This may happen in situations where the allowability of the content is readily determinable from the content itself.

In accordance with a preferred embodiment of the present invention, different policies may apply to different users. Thus a policy A may apply to a first group of users, a policy B may apply to a second group of users, and a policy C may apply to a third group of users. Conventional cache managers cannot enforce more than one policy.

Consider, for example, a given content that is allowable according to policy A but not allowable according to policy B. If a first user, governed by policy A, initially requests the content from web server 120, then content filter 160 would allow the content, and proxy server 130 would deliver it to the first user and cache it. If a second user, governed by policy B, subsequently requests the same content, then cache manager 150 would recognize that the content is already resident in cache 140 and send it to the second user, even though it is not allowable for him. The allowability test of content filter 160, based on policy B, would be by-passed, since the content would have previously passed the test, based on policy A, and was cached at that time.

To accommodate multiple policies, in accordance with a preferred embodiment of the present invention, cache manager 150 is enhanced to include a policy-based cache index 190. Policy-based cache index 190 is a data structure that indicates, for each policy, content within cache 140 that is allowable relative thereto. Preferably, as described hereinbelow, policy-based cache 190 also indicates, for each policy, content within cache 140 that is not allowable relative thereto.

Policy-based cache index 190 is preferably implemented as two sets of pointers associated with each policy. The first set of pointers, referred to as "allowability pointers," indicates content that is allowable relative to a given policy, and the second set of pointers, referred to as "non-allowability pointers," indicates content that is not allowable relative to the given policy. Although it may be appreciated that one set of pointers should suffice, it is explained hereinbelow why two sets of seemingly opposite pointers is a preferable implementation. Shown in FIG. 1, for example, is a set of allowability pointers from policies A, B and C to cached contents nos. 1–12.

Alternatively, instead of using pointers from each policy to the cache content, policy-based cache index 190 may be implemented by assigning a bit string to each cached content, the bits indicating those policies relative to which such content is allowable. Similar to the two sets of pointers described above, rather that use two states; namely, —"0" for allowability and "1" for non-allowability, a preferred embodiment of the present invention uses three states; namely, "0" for allowability, "1" for non-allowability, and "2" for non-conclusiveness.

Thus it may be appreciated that with each cached content is associated a string of numbers "0," "1" or "2," one number per policy. Those skilled in the art will appreciate that the information obtained from two sets of pointers from policies to cached content, is equivalent to the information obtained from strings of numbers "0," "1" or "2," one such number per policy. For example, if content #1 is allowable relative to policy A, not allowable relative to policy B and undetermined relative to policy C, then its associated bit string is 012.

Referring to FIG. 1, policy-based cache index 190 indicates that:
content #2, 4, 6, 8 and 12 is allowable relative to policy A;
content #1, 6, 9 and 12 is allowable relative to policy B; and
content #3, 5, 6, 9 and 10 is allowable relative to policy C.

In accordance with a preferred embodiment of the present invention, when cache manager 150 checks to determine if content requested by a user is already available within cache 140, it also checks whether the content is allowable relative to the user's policy. If the requested content is available within cache 140 and if policy-based cache index 190 indicates that the content is allowable, then the content is delivered from cache to the user. Similarly, if policy-based cache index 190 indicates that the content is not allowable, then the content is blocked. Otherwise, if policy-based cache index 190 is non-conclusive, as described hereinbelow, then cache manager 150 queries content filter 160 as to whether or not the cached content is allowable relative to the user's policy. If allowable, the content is delivered from cache 140 to the user; otherwise, it is blocked. In either case, policy-based cache index 190 is updated accordingly.

Thus, referring to the scenario above, when the second user requests the content, even though the content is resident in cache, policy-based index 190 is non-conclusive regarding allowability of the content relative to policy B. When cache manager 150 subsequently queries content filter 160, it discovers that the content is not allowable relative to policy B, and the content is blocked from delivery to the second user.

It may thus be appreciated that in accordance with a preferred embodiment of the present invention, two determinations are used to decide whether or not to transmit cached content to a user. First, a determination is made based on policy-based cache index 190. If such first determination indicates that the content is allowable for the user, then the content is delivered directly from cache to the user. If such first determination indicates that the content is not allowable for the user, then the content is blocked. Otherwise, if such first determination is non-conclusive, then a second determination is made by content filter 160, by comparing a profile of the content to the user's policy using content evaluator 180, as described hereinabove.

The first determination above may be affirmative, negative or non-conclusive. The possibility of non-conclusiveness arises from the incompleteness of policy-based cache index 190. If policy-based cache index 190 were required to include all allowability links from policies A, B and C to allowable content relative thereto, then a conclusive determination could always be made. That is, given a content in cache 140 and given a policy, policy-based cache index 190 would conclusively determine whether or not the given content is allowable relative to the given policy, simply by checking whether or not an allowability pointer exists from the given policy to the given content in cache 140.

However, in accordance with a preferred embodiment of the present invention, it is not necessary for policy-based cache index 190 to be complete. The present invention allows for policy-based cache index 190 to be updated dynamically as user requests for cached and non-cached content arrive. This is an important advantage, since otherwise it would require an exponential amount of computations to calculate a complete policy-based index cache 190, which is typically unnecessary, as the size of the cache and the number of policies increase.

Instead, policy-based index cache 190 is built up on-the-fly, as content filter 160 analyzes specific content relative to specific policies. For example, listed below is a typical sequence of stages through which policy-based cache index 190 is successively built up, in accordance with a preferred embodiment of the present invention. Initially, policy-based cache index 190 is empty. The stages described below assume that policy-based cache index 190 is implemented as two sets of pointers, as described hereinabove. In this case, there are initially no pointers created; or alternatively all pointers are initially set to NULL. It may be appreciated that if policy-based index 190 is implemented alternatively using bit strings, as described hereinabove, then initially all bits strings are stuffed with 2's, indicating that allowability of content is undetermined relative to any policy.

1. A first user, governed by policy A, requests content #1.
2. Cache manager 150 checks its cache 140 and indicates that content #1 is not resident therein.
3. Content filter 160 requests content #1 from web server 120.
4. Content scanner 170 scans content #1 to derive a profile thereof, and content evaluator 180 compares the content #1 profile with policy A, thereby determining that content #1 is allowable relative to policy A.
5. Cache manager 150 inserts content #1 in cache 140, and creates an allowability link from policy A to content #1 within policy-based cache index 190. At this stage, policy-based cache index 190 has an entry indicating that content #1 is allowable relative to policy A.
6. Proxy server 130 delivers content #1 to the first user.
7. A second user, governed by policy B, requests content #1.
8. Cache manager 150 checks its cache 140 and indicates that content #1 is resident therein.
9. Cache manager 150 checks policy-based cache index 190 regarding allowability of content #1 relative to policy B, and is non-conclusive.
10. Cache manager 150 asks content filter 160 whether or not content #1 is allowable relative to policy B.
11. Content evaluator 180 compares the content #1 profile with policy B, thereby determining that content #1 is not allowable relative to policy B.
12. Cache manager 150 creates a non-allowability link from policy B to content #1 within policy-based cache index 190. At this stage, policy-based cache index 190 has an entry indicating that content #1 is not allowable relative to policy B.
13. Proxy server 130 does not deliver content #1 to the second user.
14. A third user, governed by policy A, requests content #1.
15. Cache manager 150 checks policy-based cache index 190 regarding allowability of content #1 relative to policy A, and concludes that content #1 is allowable relative to policy A. There is no need to consult with content filter 160.
16. Proxy server 130 delivers content #1 to the third user.
17. A fourth user, governed by policy B, requests content #1.
18. Cache manager 150 checks policy-based cache index 190 regarding allowability of content #1 relative to policy B, and concludes that content #1 is not allowable relative to policy B. There is no need to consult with content filter 160.

19. Proxy server 130 does not deliver content #1 to the fourth user.

It may thus be appreciated that cache manager 150 makes cache 140 appear transparently as if it were multiple caches; e.g., a policy A cache, a policy B cache and a policy C cache. Yet through the use of policy-based cache index 190 the multiple caches are implemented as a single cache, and there is no redundancy is storage. That is, content appearing to belong to more than one policy cache is in fact stored only once.

In a preferred embodiment of the present invention, cache manager 150 is optimized for performance by designating content within cache 140 that is allowable relative to all policies. Such content can be immediately delivered to web client 110, regardless of the user's governing policy. The rationale for this optimization is that typically a large portion of content is "innocuous," and known to be above suspicion. For example, when content filter 160 is a pro-active security filter, content such as GIF and JPEG images are always allowed to pass through. By designating such content as innocuous, cache manager 150 can eliminate a great deal of unnecessary processing and time delay.

To implement the above enhancement, in accordance with a preferred embodiment of the present invention, content filter 160 generates a "strictest" policy corresponding to all of the individual user policies. For example, if the individual policies are URL filters for blocking undesirable content, then the strictest policy corresponds to filtering out all undesirable content. Similarly, if the individual policies are security policies for blocking mobile code that performs suspicious operations, then the strictest policy corresponds to blocking all suspicious operations. It is noted that the strictest policy may or may not coincide with one of the individual policies.

Preferably, whenever content filter 160 receives content from web server 120, and uses content scanner 170 to derive a profile thereof, content evaluator 180 evaluates the content first with respect to the strictest policy. If the content is allowable relative to the strictest policy, then cache manager 150 adds the content to cache 140 and designates it as being innocuous. Otherwise, if the content is not allowable relative to the strictest policy, then content evaluator 180 evaluates the content with respect to the specific policy governing the user requesting the content. The content is then preferably added to cache 140, and policy-based cache index 190 is updated to reflect the content's allowability or non-allowability relative to the user's policy.

It may thus be appreciated that content manager 150 communicates with content filter 160 in two modes, as illustrated in FIG. 1. In the first mode, referred to as a "Get Content" mode, content manager requests and receives content from content filter 160. In the second mode, referred to as a "Permitted?" mode, content manager requests a determination of allowability of a specific content relative to a specific policy.

As policies are changed and as cached content is updated, policy-based cache index 190 is preferably synchronized so as to maintain compatibility with current content and policies. Alternatively, but less efficient, updated content can be purged from cache 140, and cache manager 150 can reset policy-based cache 190 by setting the pointers from a changed policy to NULL. Equivalently, cache manager 150 can modify the bit strings to have a "2" in the position corresponding to the changed policy. This ensures that cached content is not mistakenly delivered when it is not allowed according to the changed policy.

When a new policy is added, policy-based cache index 190 is updated accordingly. A new policy is added, with all of its pointers set to NULL. Equivalently, the bit strings are enlarged to include an addition "2" at their ends, or at another fixed position within the strings. This ensures that cached content is not mistakenly delivered when it is not allowed according to the new policy.

Figure 2:
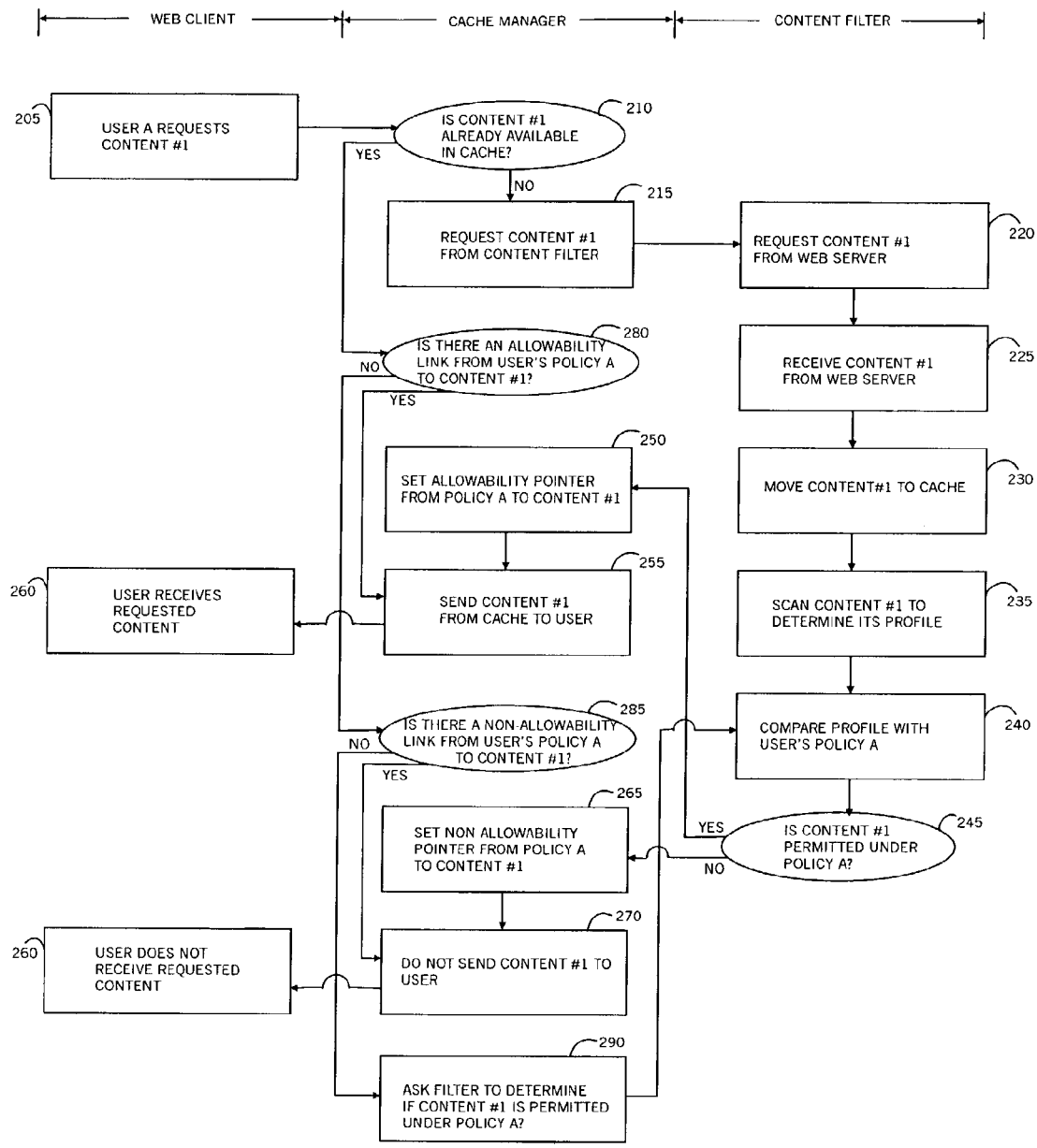
FIG. 2 is a simplified flowchart for use of a policy-based cache, in accordance with a preferred embodiment of the present invention.

Reference is now made to FIG. 2, which is a simplified flowchart for use of a policy-based cache, in accordance with a preferred embodiment of the present invention. FIG. 2 is divided into three columns. The leftmost column indicates steps performed by a web client, such as web client 110 (FIG. 1). The middle column indicates steps performed by a cache manager, such as cache manager 150. The rightmost column indicates steps performed by a content filter, such as content filter 160.

As shown in FIG. 2, at step 205 a user requests content #1 from a proxy server. At step 210 the cache manager checks whether or not content #1 is already resident within its cache. If not, then at step 215 the cache manager requests content #1 from the content filter, which in turn requests content #1 from a web server, such as web server 120 (FIG. 1) at step 220. Step 215 corresponds to the "Get Content" arrow indicated in FIG. 1. At step 225 the content filter receives content #1 from the web server. At step 230 the content filters stores the content #1 within the cache. At step 235 the content filter scans content #1 to derive a profile thereof, using a content scanner such as content scanner 170. At step 240 the content filter evaluates content #1 by comparing its profile with the user's governing policy, policy A, using a content evaluator such as content evaluator 180.

At step 245 the content filter checks whether or not content #1 is allowable relative to policy A. If content #1 is allowable, then at step 250 an allowability pointer is set from policy A to content #1, as described hereinabove with reference to policy-based cache index 190 (FIG. 1). Thereafter, at step 255 the cache manager sends content #1 to the user, and finally at step 260 the user receives the content that he had requested at step 205.

Otherwise, if step 245 determines that content #1 is not allowable relative to policy A, then at step 265 a non-allowability pointer is set from policy A to content #1. At step 270 the cache manager blocks content #1 from being delivered to the user, and at step 275 the user does not receive the content that he had requested at step 205.

If the cache manager determines at step 210 that content #1 is already available in its cache, then at step 280 a further check is made as to whether or not there is an allowability pointer from policy A to content #1. If there is an allowability pointer, then at step 255 the cache manager sends content #1 to the user as above. In this case, the cache manager does not need to consult with the content filter in order to determine allowability.

If at step 280 an allowability pointer from policy A to content #1 is not found, then at step 285 a further check is made as to whether or not there is a non-allowability pointer from policy A to content #1. If a non-allowability pointer is found, then at step 270 the cache manager blocks content #1 from being delivered to the user, as above. In this case as well, the cache manager does not need to consult with the content filter in order to determine allowability.

If at step 285 a non-allowability pointer from policy A to content #1 is not found, then at step 290 the content manager asks content filter to determine whether or not content #1 is allowable. Step 290 corresponds to the "Permission?" arrow indicated in FIG. 1. At step 240, the content filter evaluates content #1 by comparing its profile to policy A.

At step 245, the allowability decision determined at step 240 is checked. If content #1 is allowable, then the cache manager proceeds to step 250 as above. Otherwise, if the cache manager determines at step 245 that content #1 is not allowable, then the cache manager proceeds to step 265 as above.

It may be appreciated, as mentioned hereinabove, that the use of allowability and non-allowability pointers in FIG. 2 may be replaced with the use of bit strings.

It may further be appreciated that the division of steps in FIG. 2 between the cache manager and the content filter is somewhat arbitrary, and some steps indicated as being performed by the cache manager or the content filter may instead be performed by the other.

The cache manager of the present invention preferably operates in conjunction with standard caching operations, including inter alia cache updating, cache refresh, allocation of cache memory, virtual cache, and cache purging based on algorithms such as oldest vs. newest, least-used vs. most-used, and largest vs. smallest.

The present invention has many diverse applications. In conjunction with content control systems, as described hereinabove, the present invention is advantageous inter alia for URL filtering, e-mail anti-spam filtering, anti-virus protection and malicious mobile code protection systems. In conjunction with document management systems, the present invention is advantageous inter alia for document protection, version control and data encryption. In conjunction with file management systems, the present invention is advantageous inter alia for file protection and file sharing. In conjunction with multimedia systems, the present invention is advantageous inter alia for cable and satellite broadcasting, video on demand, streaming audio and video, and access to still imagery.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A policy-based cache manager, comprising:
a memory storing a cache of digital content, a plurality of policies, and a policy index to the cache contents, the policy index including entries that relate cache content and policies by indicating cache content that is known to be allowable relative to a given policy, for each of a plurality of policies;
a content scanner, communicatively coupled with said memory, for scanning a digital content received, to derive a corresponding content profile; and
a content evaluator, communicatively coupled with said memory, for determining whether a given digital content is allowable relative to a given policy, based on the content profile, the results of which are saved as entries in the policy index.

2. The policy-based cache manager of claim 1 wherein the policy index includes pointers to the cache contents.

3. The policy-based cache manager of claim 1 wherein the policy index includes allowability pointers and non-allowability pointers.

4. The policy-based cache manager of claim 1 wherein the policy index includes bit strings associated with the cache contents.

5. The policy-based cache manager of claim 1 wherein the policy index includes strings of numbers "0," "1" and "2," one number per policy.

6. The policy-based cache manager of claim 1 further comprising a transmitter for transmitting allowable content from the cache to a client computer.

7. The policy-based cache manager of claim 1 further comprising a receiver for receiving digital content from a web server.

8. The policy-based cache manager of claim 1 wherein the policy index designates cache content that is allowable relative to all of the plurality of policies.

9. The policy-based cache manager of claim 1 wherein the plurality of policies are used for URL filtering.

10. The policy-based cache manager of claim 1 wherein the plurality of policies are used for anti-virus protection.

11. The policy-based cache manager of claim 1 wherein the plurality of policies are used for security detection for malicious mobile code.

12. The policy-based cache manager of claim 1 further comprising a cache reader for determining whether a given digital content is available in cache, and, if so, whether the policy index indicates that the given digital content is allowable relative to a given policy.

13. A method for policy-based caching, comprising:
providing a memory storing a cache of digital content, a plurality of policies, and a policy index of the cache contents, the policy index including entries that relate cache content and policies by indicating cache content that is known to be allowable relative to a given policy, for each of a plurality of policies;
receiving a user request for a digital content, the user having associated therewith a policy from among the plurality of policies;
determining based on the cache, whether the requested digital content is already available; and
if said determining based on a cache indicates that the data content is already available in the cache then
further determining based on the policy index of the cache contents, whether the requested digital content is allowable for the user;
else
further determining based on a profile of the requested data content, whether the requested data content is allowable for the user's policy; and
storing an indication of the results of said further determining whether the requested data is allowable, within the policy index.

14. The method of claim 13, further comprising transmitting the requested digital content from the cache to the user, if said determining based on a policy index or said determining based on a profile indicates that the requested digital content is allowable.

15. The method of claim 13 further comprising scanning received data content to derive a profile thereof.

16. The method of claim 13 wherein the policy index includes pointers to the cache contents.

17. The method of claim 16 wherein the policy index includes allowability pointers and non-allowability pointers.

18. The method of claim 13 wherein the policy index includes bit strings associated with the cache contents.

19. The method of claim 18 wherein the policy index includes strings of numbers "0," "1" and "2," one number per policy.

20. The method of claim 13 further comprising updating the policy index according to said determining based on a profile.

21. The method of claim 13 further comprising identifying cached content that is allowable relative to all of the plurality of policies.

22. The method of claim 13 further comprising resetting at least a portion of the policy index, when a policy is changed.

23. A computer-readable storage medium storing program code for causing a computer to perform the steps of:
provniding a memory storing a cache of digital content, a plurality of policies, and a policy index of the cache contents, the policy index including entries that relate cache content and policies by indicating cache content that is known to be allowable relative to a given policy, for each of a plurality of policies;
receiving a user request for a digital content, the user having associated therewith a policy from among the plurality of policies;
determining based on the cache, whether the requested digital content is already available; and
if said determining based on a cache indicates that the data content is already available in the change, then
determining based on the policy index of the cache contents, whether the requested digital content is allowable for the user;
else:
determining based on a profile of the requested data content, whether the requested data content is allowable for the user's policy; and
storing an indication of the results of said further determining whether the requested data is allowable, within the policy index.

24. The policy-based cache manager of claim 1 wherein the policy index is dynamically generated as results of said content evaluator are derived.

25. The method of claim 13 further comprising dynamically generating the policy index as said determining based on a profile of the requested data content is performed.

26. A method for policy-based caching, comprising:
providing a memory storing a cache of digital content, and a plurality of policies; and
dynamically generating a policy index of the cached contents, the policy index including entries that relate cached content and policies, by indicating pieces of cached content known to be allowable relative to a given policy, for each of a plurality of policies, comprising:
determining, based on a profile of a piece of digital content, whether the piece of digital content is allowable for a given policy; and
storing an indication of the results of said determining whether the piece of digital content is allowable within the policy index, comprising:
if the piece of digital content is not already resident in the cache, then:
adding the piece of digital content into the cache; and
adding an entry in the policy index indicating the allowability or the non-allowability of the piece of digital content relative to the given user policy, based on the result of said determining;
else if the piece of digital content is already resident in the cache, then modifying an already existing entry in the policy index indicating the allowability or the non-allowability of the cached piece of digital content relative to the given policy, based on the result of said determining.

27. The method of claim 25 wherein entries of the policy index indicate, for each of a plurality of pieces of cached content, one of three states: (i) knowledge of allowability of a piece of cached content relative to a given policy, (ii) knowledge of non-allowability of a pieced of cache content relative to a given policy, or (iii) lack of knowledge regarding allowability of a piece of cached content relative to a given policy.

28. The method of claim 27 wherein entries of the policy index are represented as dynamically changing character strings, one character string per each of a plurality of pieces of cached content, and one character within a string per policy, the strings indicating (i) policies for which the piece of cached content is currently known to be allowable, (ii) policies for which the piece of cached content is currently known to be non-allowable, and (iii) policies for which knowledge is currently lacking as to the allowability or non-allowability of the piece of cached content relative thereto.

29. The method of claim 27 wherein entries of the policy index are represented as dynamically changing lists of currently allowed pieces of cache content and lists of currently non-allowed pieces of cache content, relative to a given policy, such lists for each of a plurality of policies.

30. The method of claim 27 further comprising modifying entries in the policy index so as to indicate current lack of knowledge of allowability for at least one of the plurality of policies, when the at least one of the plurality of policies are changed.

31. The method of claim 27 further comprising modifying entries in the policy index so as to indicate current lack of knowledge of allowability for a new policy, when the new policy is added to the plurality of policies.

32. A computer-readable storage medium storing program code for causing a computer to perform the steps of:
providing a memory storing a cache of digital content, and a plurality of policies; and
dynamically generating a policy index of the cached contents, the policy index including entries that relate cached content and policies by indicating pieces of cached content known to be allowable relative to a given policy, for each of a plurality of policies, comprising:
determining, based on a profile of a piece of digital content, whether the piece of digital content is allowable for a given user policy; and
storing an indication of the results of said determining whether the piece of digital content is allowable within the policy index, comprising:
if the piece of digital content is not already resident in the cache, then:
adding the piece of digital content into the cache; and
adding an entry in the policy index indicating the allowability or the non-allowability of the piece of digital content relative to the given user policy, based on the result of said determining;
else if the piece of digital content is already resident in the cache, then modifying an already existing entry in the policy index indicating the allowability or the non-allowability of the cached piece of digital content relative to the given user policy, based on the result of said determining.

33. A policy-based cache manager, comprising:
- a memory for storing a cache of digital content, and a plurality of policies;
- a policy index generator for dynamically generating a policy index to the cached contents, the policy index including entries that relate pieces of cached content and policies, by indicating pieces of cache content that are known to be allowable relative to a given policy, for each of a plurality of policies; and
- a content evaluator, communicatively coupled with said policy index generator, for determining whether a piece of digital content is allowable relative to a given policy, based on a profile of the piece of digital content, and for storing the results of the determining within entries of the policy index.

34. The policy-based cache manager of claim 33 wherein entries of the policy index indicate, for each of a plurality of pieces of cached content, one of three states: (i) knowledge of allowability of a piece of cached content relative to a given policy, (ii) knowledge of non-allowability of a pieced of cache content relative to a given policy, or (iii) lack of knowledge regarding allowability of a piece of cached content relative to a given policy.

35. The policy-based cache manager of claim 34 entries of the policy index are represented as dynamically changing character strings, one character string per each of a plurality of pieces of cached content, and one character within a string per policy, the strings indicating (i) policies for which the piece of cached content is currently known to be allowable, (ii) policies for which the piece of cached content is currently known to be non-allowable, and (iii) policies for which knowledge is currently lacking as to the allowability or non-allowability of the piece of cached content relative thereto.

36. The policy-based cache manager of claim 34 wherein entries of the policy index are represented as lists of currently allowed pieces of cache content and lists of currently non-allowed pieces of cache content, relative to a given policy, such lists for each of a plurality of policies.

37. The policy-based cache manager of claim 34 wherein said policy index generator modifies entries in the policy index so as to indicate current lack of knowledge of allowability for at least one of the plurality of policies, when the at least one of the plurality of policies are changed.

38. The policy-based cache manager of claim 34 wherein said policy index generator modifies entries in the policy index so as to indicate current lack of knowledge of allowability for a new policy, when the new policy is added to the plurality of policies.

* * * * *